United States Patent [19]
Lewis

[11] 3,820,401
[45] June 28, 1974

[54] PIEZORESISTIVE BRIDGE TRANSDUCER

[75] Inventor: Edward T. Lewis, Sudbury, Mass.

[73] Assignee: Sperry Rand Corporation, New York, N.Y.

[22] Filed: Nov. 7, 1972

[21] Appl. No.: 304,422

[52] U.S. Cl. ............ 73/398 AR, 73/88.5 SD, 338/4
[51] Int. Cl. ................................................ G01l 1/22
[58] Field of Search..... 73/88.5 SD, 398 AR; 338/4, 338/42

[56] References Cited
UNITED STATES PATENTS

| | | | |
|---|---|---|---|
| 3,337,780 | 8/1967 | Robbins | 73/88.5 SD |
| 3,417,361 | 12/1968 | Heller et al. | 338/42 |
| 3,478,604 | 11/1969 | Evans | 73/88.5 SD |
| 3,513,430 | 5/1970 | Heller | 73/88.5 SD |
| 3,662,312 | 5/1972 | Thorp et al. | 73/88.5 SD |
| 3,697,918 | 10/1972 | Orth et al. | 73/88.5 SD |

Primary Examiner—Charles A. Ruehl
Attorney, Agent, or Firm—Howard P. Terry

[57] ABSTRACT

A temperature stable piezoresistor bridge is diffused into the surface of a pressure sensing semiconductor diaphragm formed integrally with a semiconductor body, the diaphragm and body together defining a cavity within the miniature unitary pressure-responsive transducer. Diffused isolation fields and diffused resistors generated at the surfaces of the fields form the piezoresistor bridge on a first semiconductor wafer having a given crystallographic orientation, which structure is then provided with electrically isolated conductors. The first wafer is then bonded to a second wafer of similar material and similar crystallographic orientation for fully defining the cavity element.

12 Claims, 20 Drawing Figures

PATENTED JUN 28 1974 3,820,401

PRIOR ART

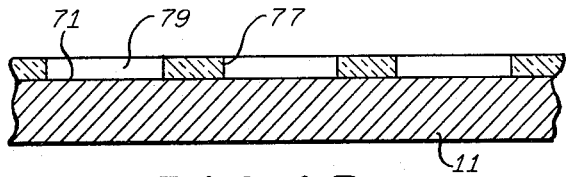
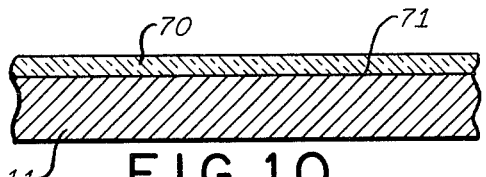
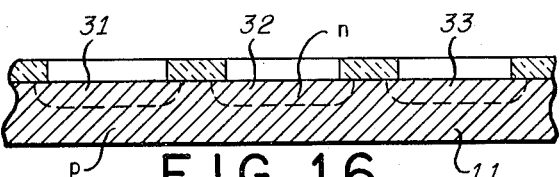
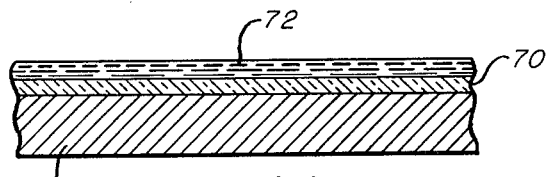
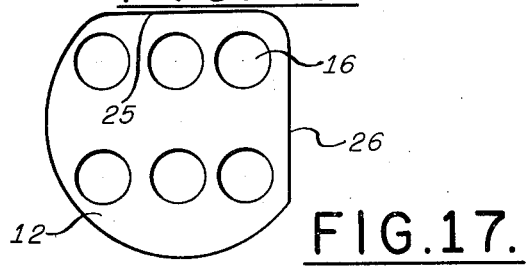
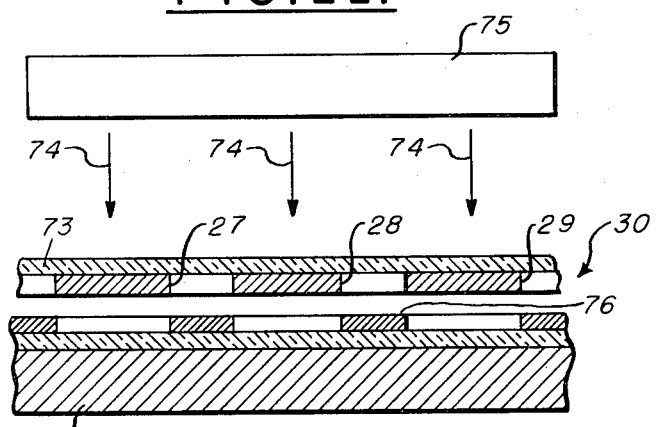
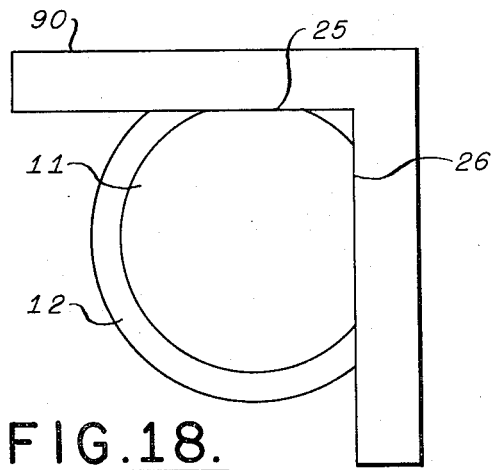
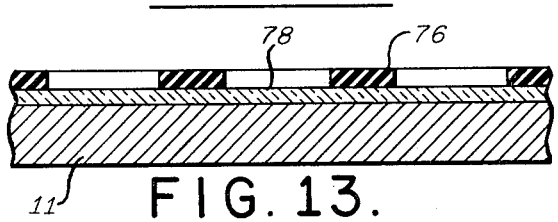
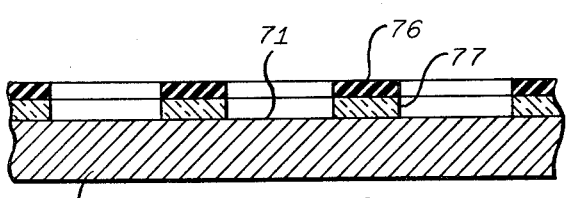
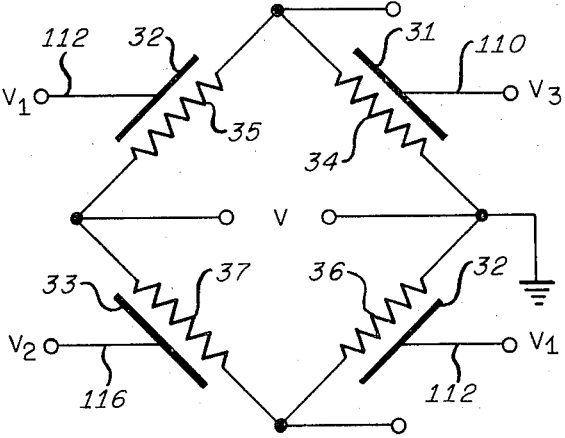

PIEZORESISTIVE BRIDGE TRANSDUCER

BACKGROUND OF THE INVENTION

1. Field of the Invention

The invention pertains generally to the field of miniature pressure sensing transducers of the type generally devoid of moving mechanical parts and is more particularly concerned with high-sensitivity miniature pressure sensing transducers utilizing a piezoresistor bridge circuit for sensing deflection of a diaphragm against which fluid pressure is exerted.

2. Description of the Prior Art

Generally, prior art pressure measuring devices encompass a wide variety of structures and principles. Each various approach has been found to have its particular merits; but many defects are also present, such as lack of sensitivity and reliability on the one hand, and fragility and high cost on the other. Some pressure transducer arrangements, for example, involve complex auxiliary equipment, such as feed back mechanisms for providing reliable calibration or constant temperature enclosures, for example.

In an effort, to develop improved pressure sensing transducer devices, attention has turned to semiconductor piezoelectric and piezoresistive devices and to other sensors beneficially employing techniques and discoveries attached to recent microcircuit and digital circuit developments. Such devices are generally described in the prior art. By way of example, the O. N. Tufte and D. Long paper "Recent Developments in Semiconductor Piezoresistive Devices," *Solid State Electronics*, 1963, Vol. 6, pages 323 to 338 may be mentioned as of general interest.

The Tufte et al paper describes a wide variety of piezoresistor transducers, including direct pressure transducers of the kind employing silicon diffused-element piezo-resistive diaphragms of the clamped type. In most past transducer applications, a sensor having a diaphragm rigidly clamped at its periphery is needed.

In past practice, it has proven difficult to provide the needed uniformity, accuracy, and repeatability in the way in which the diaphragm is clamped at its circumference to the body of the transducer. Any mismatch in thermal expansion and other coefficients between the diaphragm and clamping materials induces undesired symmetric and asymmetric stresses in the diaphragm and sensor bridge, especially when temperture varies over an appreciable range. Such thermally induced dimensional changes destroy accuracy of calibration of the sensor bridge and make it relatively useless.

Prior art piezoresistor pressure sensors are relatively expensive to manufacture especially if high accuracy and sensitivity are required. Further, cost of manufacture is high because techinques affording mass manufacture have not been involved and the transducers have generally been constructed unit by unit.

SUMMARY OF THE INVENTION

The present invention relates to miniature piezoresistor pressure transducer devices having configurations adapted to mass manufacture and having substantially no mechanically moving elements. The novel transducer devices employ piezoresistor bridges for providing an electrical measure of the deflection of a pressure stressed semiconductor diaphragm forming a continuing part of a sensor body so that uniform integration of the diaphragm with the body of the transducer is assured and freedom of undesired temperature sensitivity characterizes the product.

BRIEF DESCRIPTION OF THE DRAWINGS

FIG. 4 is a plan view of the devices of FIGS. 3 and 3a.

FIGS. 9 through 16 illustrate steps in the manufacture of the invention.

FIG. 17 is a top view of a third mask used in making the apparatus of FIGS. 3, 3a, 4, and 5.

FIG. 18 is a top view of a jig used in making the novel transducer.

FIG. 19 is a wiring diagram of a resistor bridge useful in explaining operation of one form of the transducer.

DESCRIPTION OF THE PREFERRED EMBODIMENTS

Figure 1:
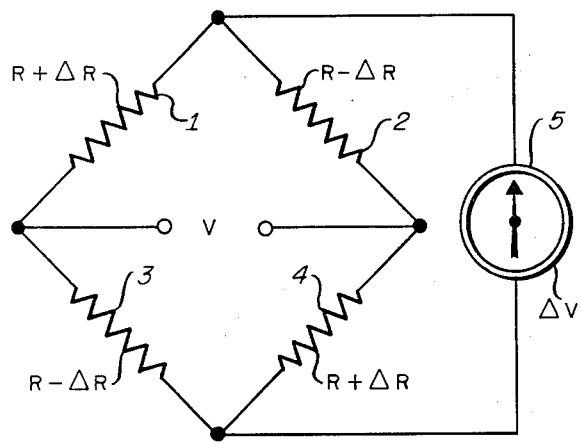
FIG. 1 is a wiring diagram of a prior art resistance bridge circuit.
Figure 2:
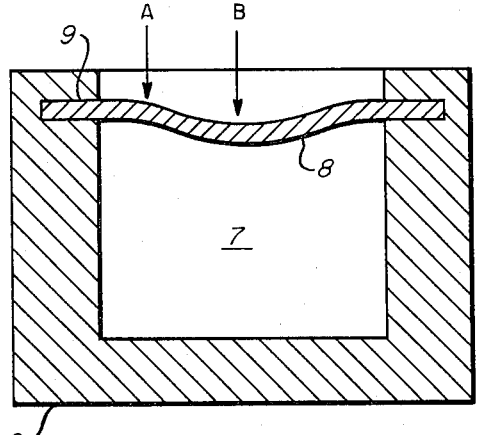
FIG. 2 is a cross-section elevation view of a prior art pressure sensor.
Figure 3:
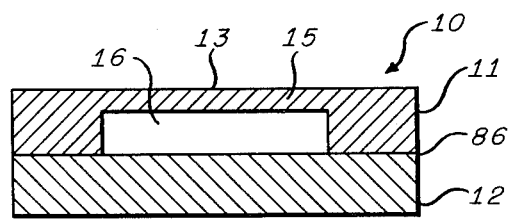
FIGS. 3 and 3a are cross-section elevation views of alternative forms of the present invention.
Figure 4:
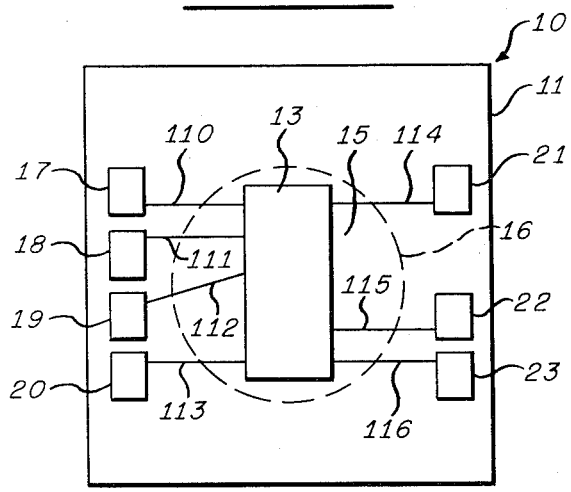
Figure 3A:
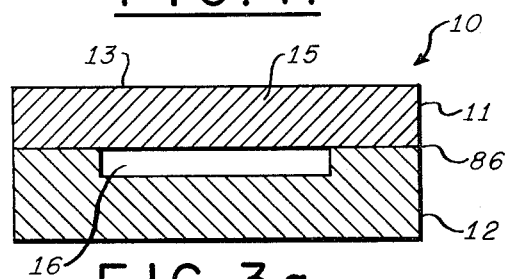

The novel pressure transducer 10 of FIGS. 3, 3a, and 4 comprises a silicon diaphragm 15 at the outer surface of which a matched set of four resistors is incorporated by material diffusion; the resistors are interconnected by evaporated film electrical conductors. A schematic wiring diagram of a bridge of this general type is seen in FIG. 1 to include the series connected resistors 1, 2, 3, and 4; between one pair of opposite terminals of the bridge is connected a source of voltage, while across the alternate pair is connected a meter 5 or other device designed to react to unbalance of the bridge circuit. When the resistor bridge is located on a diaphragm such as diaphragm 8 of FIG. 2, the periphery of diaphragm 8 being rigidly clamped at 9 in the body 6 defining cavity 7, the resistors 1 to 4 may experience either tensile or compressive strains. In practice, the resistor elements 1 to 4 are placed at the surface of diaphragm 8 in such locations that two are generally in tension and the other two are generally in compression. For example, a piezoresistor located near A in FIG. 2 experiences tension when diaphragm 8 moves inwardly, while a piezoresistor near location B experiences compression. As is well known in the art, the resistances of piezoresistors change under tension or compression from a normal value and the net result of diaphragm flexure is a bridge unbalance $\Delta V_o$ sensed by meter 5, for example.

According to the present invention, the difficulties of the prior art are overcome by constructing the entire pressure transducer 10 of a semiconductor material such as silicon and especially by fashioning the bridge sensor-bearing diaphragm 15 in a unitary fashion with a major part 11 of the transducer, symmetrically closing the cavity 16 of the transducer with a second major element 12 of the device with a bond remote from the diaphragm 15. Diaphragm 15 is now an integral part of a solid structural element 11 which latter, instead of the diaphragm 15, may be directly bonded to the second portion 12 of the transducer 10. Further advantages of the novel configuration will become apparent as its structure and the method of its fabrication are described in greater detail.

As viewed in FIG. 4, it is seen that the novel pressure transducer 10 has an upper surface below which the pressure cavity 16 resides, being covered by a diaphragm 15. Diaphragm 15 supports the novel bridge sensor within the circular border of the area of cavity 16. The bridge sensor is merely indicated in FIG. 4 by the rectangle 13. Conductors 110 through 116 emanate from the bridge in rectangle 13 and couple to respective enlarged terminals 17 through 23 at edges of transducer 10.

Figure 5:
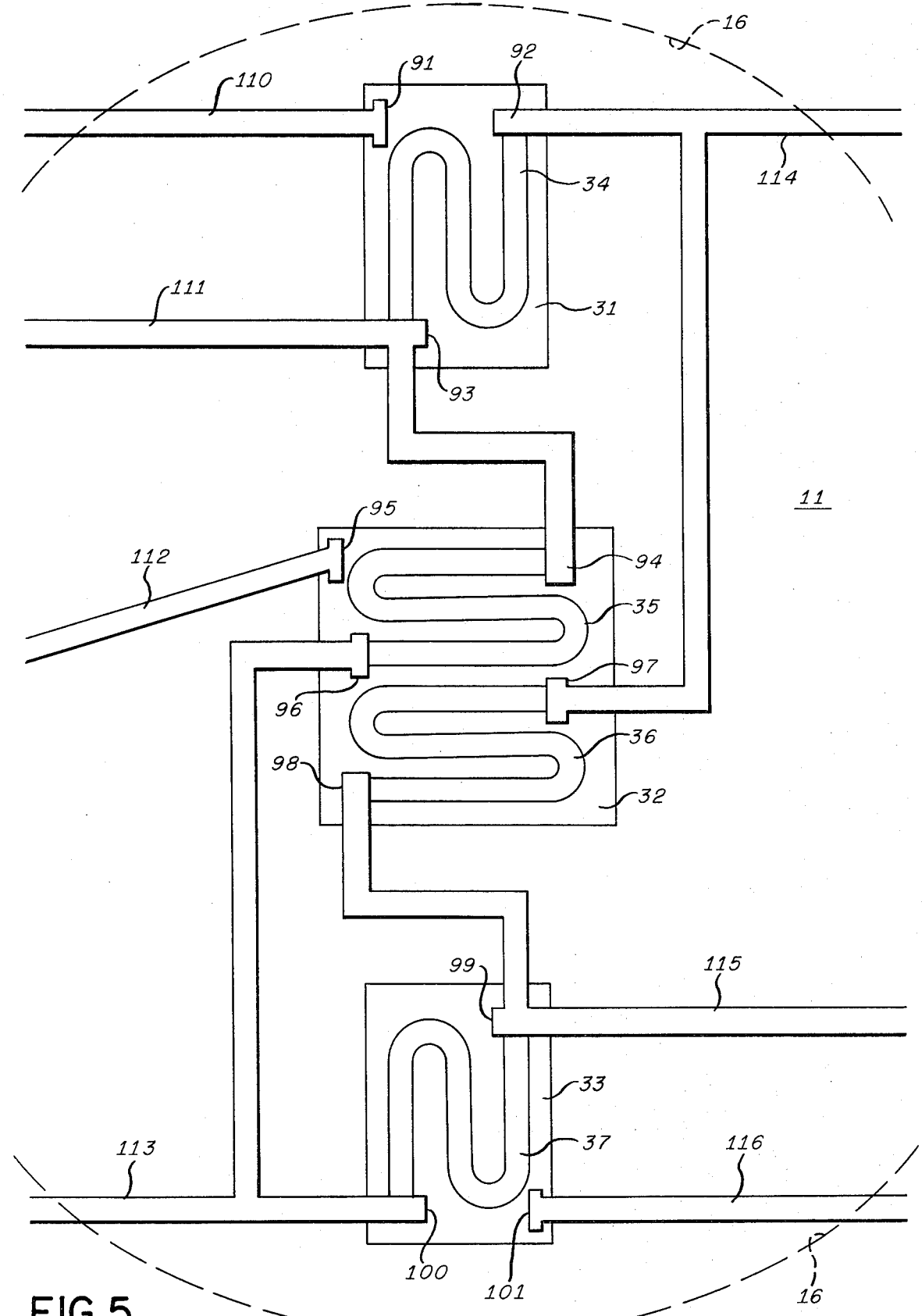
FIG. 5 is a large scale plan view of a part of the apparatus of FIG. 4.

FIG. 5 illustrates on a greatly enlarged basis the sensor bridge of rectangle 13 as residing above cavity 16 on diaphragm 15, First, second, and third type n isolation fields 31, 32, and 33 are diffused into the surface of the type p silicon surface of wafer 11. Isolation fields 31 and 33 contain respective generally ess-shaped resistors 34 and 37 which are constructed or type p semiconductor material and lie within the bounds of the respective type n semiconductor isolation fields 31 and 33. The major portions of resistors 34 and 37 constitute lineal sections which are placed to react to tension forces.

The third type n semiconductor isolation field 32 is placed symmetrically between fields 31 and 33; it includes a pair of side-by-side generally ess-shaped type p semiconductor resistors 35 and 36 whose major lineal sections are oriented at right angles to the corresponding parts of resistors 34 and 37 and which are located so as to be subjected primarily to compressional forces.

The surface-bonded electrical conductor 111 forms a common junction at contact 93 between resistors 34 and 35. The similar electrical conductor 113 forms a common lead connecting to the respective contacts 96 and 100 of resistors 35 and 37. Conductor 114 forms a common lead connecting the respective contacts 92 and 97 of resistors 34 and 36. Conductor 115 forms a common junction at contact 99 between resistors 36 and 37. Conductor 110 is connected to isolation field 31 at contact 91, conductor 112 is connected to isolation field 32 at contact 95, and conductor 116 is connected to isolation field 33 at contact 101. It will be understood that the foregoing conductors are insulated from the surface of element 11 except at the several contacts mentioned in this paragraph.

It will be appreciated that FIG. 5 and even FIG. 4 are large scale drawings and that the novel structure of the invention and the method of its construction permit very small transducers to be constructed. For example, the type n isolation field 31 of FIG. 5 may measure 13 by 30 mils, while resistor 34 consists of a thin strip about 2 mils wide, the nominal length of resistor 34 being 44 mils. A representative size for each pressure transducer is 100 by 100 by 20 mils. One hundred individual transducers according to the invention may be made from two 3.8 centimeter diameter silicon wafers. Understanding of the structure of the invention will be further enhanced by considering its method of fabrication.

Referring now to FIG. 9, the basic starting material for the upper portion of the novel pressure transducer 10 actually bearing the bridge sensor element 13 at its upper surface is a planar substrate or wafer 11 comprising a type p silicon wafer which may be purchased from a vendor already having a resistivity of 10 ohm centimeters, being heavily doped with boron to achieve the desired resistivity.

The purchased wafer 11 is generally circular, but may be supplied by the vendor with flat mutually perpendicular surfaces as seen at 25 and 26 in FIG. 5 that are used, as will be described, for alignment of the two wafer body parts 11 and 12 of the transducer several times during its assembly. The major parallel surfaces of the type $p$ wafer 11 are cut parallel to the [111] crystallographic direction of the silicon material. Flat surface 25 is cut in the [1$\bar{1}$0] direction, while surface 26 is cut 90° therefrom, or in the [11$\bar{2}$] direction.

Upon receipt, the wafer is cleaned in the conventional manner in an ultrasonically agitated cleaning bath of known composition. While still clean, a silicon oxynitride (SiON) layer 70 is grown to a thickness of substantially 2,000 Angstroms on one surface 71 of the type $p$ substrate 11, as in FIG. 10. Pyrolytic deposition of silicon oxynitride may be accomplished according to the method presented in the N. C. Tombs U.S. Pat. 3,422,321 for "Oxygenated Silicon Nitride Semiconductor Devices and Silane Method for Making Same," issued Jan. 14, 1969 and assigned to the Sperry Rand Corp. In the Tombs method, interaction of silane ($SiH_4$), ammonia ($NH_3$), and nitrous oxide ($N_2O$) is brought about in a reaction chamber at a temperature in the general range of 600° Centigrade to about 1,000° Centigrade. The reaction produces nascent ions of silicon, nitrogen, and oxygen which molecularly combine and deposit as a solid on the substrate material as silicon oxynitride. Other methods of deposition of silicon oxynitride may be employed, including the method of R. I. Frand et al described in U.S. Pat. No. 3,629,008 for a "Sputtering Method for Deposition of Silicon Oxynitride," issued Dec. 21, 1971 and also assigned to the Sperry Rand Corp.

FIG. 11 illustrates the appearance of type p wafer 11 after a layer 72 of photoresist material is formed on top of the silicon oxynitride layer 70. For this purpose, the wafer is treated immediately after removal from the silane reaction chamber, the photoresist material being spread in liquid form uniformly over the silicon oxynitride surface and then being permitted to dry to form the actinic-ray sensitive layer 72.

Figure 6:
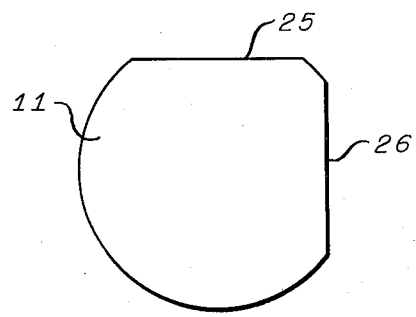
FIG. 6 is an elevation view of a semiconductor wafer.

As in FIG. 12, a previously prepared mask 30 having a multiplicity of opaque patterns on a transparent backing 73 is placed over the structure of FIG. 11 (the two parts may be in actual contact but are shown as separated for clarity in the drawing). Mask 30 is provided with mutually perpendicular index lines 25a, 26a for alignment with respect to the respective edges 25, 26 of wafer 11. For example, the mask 30 used for generating the cooperating type $n$ isolation fields 31, 32, and 33 of FIGS. 6 and 15 has sets of three cooperating opaque rectangular areas such as the set 27, 28, and 29. As seen in FIG. 6, a large plurality of such opaque tripartite sets will normally be employed, so that sensor elements for many transducers may be fabricated simultaneously from one wafer 11.

The mask 30 is illuminated after its alignment with wafer 11 by actinic ultraviolet energy, as indicated by arrows 74, supplied by a conventional ultraviolet source 75. This exposure causes areas of photoresist layer 76 to be activated, the photoresist material under the transparent portions of mask 30 being polymerized in the usual manner, while those regions of photoresist under the dark areas 27, 28, 29 of mask 30 remain unchanged. The mask 30 is removed and the wafer is placed at once into a conventional developer solution. The non-exposed areas of the photoresist layer 72 of FIG. 11 are thus dissolved, while the darkened polymerized areas remain intact, as in FIGS. 12 and 13.

The wafer is next placed in an agitated conventional buffered hydrofluoric acid etchant and the silicon oxynitride material not protected by developed photoresist material is removed, as at 78, as deep as the formerly covered surface 71 of the type $p$ silicon layer 11, and as shown in FIG. 14. The etchant may comprise, for example, a solution having one part of hydrofluoric acid and nine parts of amonium fluoride. After etching, the wafer is rinsed in de-ionized water and is dried. The remaining photoresist material is then removed by a stripper such as a solution of one part sulfuric acid in nine parts of nitric acid used at a temperature near 100° Centigrade for about ten minutes. With the developed photoresist removed, the wafer has the appearance of FIG. 15, where the pattern of elements 77 outlines the windows 79.

The objective of the windows or apertures 79 in the silicon oxynitride layer 70 is to permit diffusion of a type $n$ dopant such as phosphorous into layer 11, the remaining parts 77 of the oxynitride layer acting as barriers to such dopant diffusion in the usual manner. Phosphorous doping is readily accomplished from the vapor phase through windows 79 into layer 11 in a hot reaction chamber. For example, phosphorous pentoxide may thus be applied in the conventional manner at a temperature of about 1,050° Centigrade for a period of substantially 15 minutes.

However, the diffusion process preferred to be employed is a dual step process. In the first step, the dopant is deposited primarily at the surface 71 of window 79 by exposing surface 71 to a temperature between 800° and 1,200° Centigrade in an atmosphere of the selected dopant species for a period of time up to about 30 minutes. This event will produce a surface concentration of dopant ions of about $10^{19}$ per cubic centimeter, dropping off to about zero at a depth of about 3 microns in layer 11. The wafer is then immediately exposed in the same reactor, but in the substantial absence of dopant material, to a higher temperature. This is for the purpose of driving the type n dopant material deeper into the type $p$ layer 11 while reducing the surface concentration somewhat. A drive-in temperature of about 1,200° Centigrade is used for 20 hours for this latter purpose. A surface concentration of about $2 \times 10^{16}$ ions per cubic centimeter is achieved, dropping off to about zero at a depth in layer 11 of 10 to 15 microns. The result of the type n diffusion treatment is shown in FIG. 16 wherein the inlaid type n isolation field regions 31, 32, 33 are illustrated.

Figure 7:
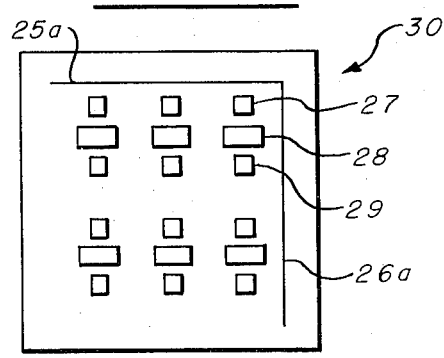
FIGS. 7 and 8 are top views of masks used in making the devices of FIGS. 3, 3a, 4, and 5.
Figure 8:
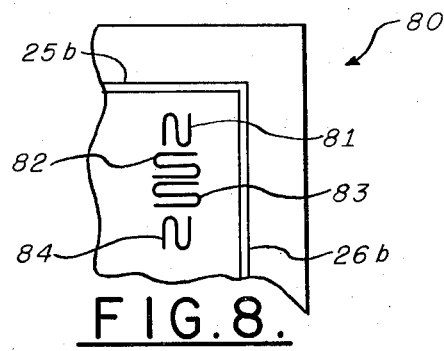

A second diffusion process is employed to form the type p resistors 34, 35, 36, and 37 (FIG. 5) within the type n isolation fields. Type p conductivity is used for the several resistors, the greater piezoresistive effect being achieved by large crystal deformation. The greatest crystal deformation is achieved in tension or in compression in the [111] direction. Resistor 34 is to be placed in type n isolation field 31, resistors 35 and 36 in type n isolation field 32, and resistor 37 in type n isolation field 33. This second diffusion process is similar to that of FIGS. 9 through 16 with certain exceptions. The mask 80 of FIG. 8 is substituted for mask 30 of FIG. 7. The two masks are substantially the same in size (though FIG. 8 is drawn on a large scale as a matter of convenience), and mask 80 has alignment indexing lines 25b, 26b similar to index lines 25a, 26a of mask 30. Where mask 30 employed the opaque rectangles 27, 28, 29, mask 80 substitutes the curvate resistor shapes 81, 82, 83, 84.

A further distinction lies in the nature of the diffusion process, since a type $p$ dopant, such as boron, is to be employed. Boron may actually be diffused in its gas phase if wafer 11 is exposed to it in a furnace reactor at about 1,150° Centigrade. For example, the deposition or initial diffusion phase may operate at 1,150° Centigrade for 10 minutes with a 10 minute drive-in phase in the substantial absence of a dopant atmosphere. Alternatively, boron metal or its oxide may be deposited on the exposed surface of layer 11 by sputtering or by evaporation in a vacuum, which material may then be driven into type $p$ layer 11 to a depth of about 3 microns by intense heating, generally as in the more conventional drive-in diffusion process. Once the field-forming and resistor-forming diffusion processes are completed, a protective layer of silicon oxynitride is pyrolytically deposited over the entire surface of the wafer that includes the type n semiconductor fields 31, 32, and 33 and the type $p$ resistors 34, 35, 36, and 37.

As noted in connection with FIGS. 3 and 3a, the pressure sensing cavity 16 may be formed in the bridge sensor-bearing layer 11 as in FIG. 3, or may be placed in the base wafer layer 12 of the transducer as in FIG. 3a. In the following discussion of cavity formation, the description will arbitrarily be in terms of forming cavity 16 as in FIG. 3a in the base part 12 of the transducer. However, those skilled in the art will understand that substantially the same process may be used in making the FIG. 3 configuration. The choice between the structures of FIGS. 3 and 3a depends essentially upon how thin a diaphragm 13 is desired.

Where cavity 16 is to be formed in base layer 12, a wafer 12 similar to wafer 11 is selected. The wafer 12 is again cut with its major surfaces in the [111] crystallographic direction and with mutually perpendicular flats 25 and 26 that are formed and oriented as previously described in connection with FIG. 6. Again, a series of steps may be employed that are similar to the steps described in connection with FIGS. 9 through 14, using an appropriate mask 30. In this case, mask 30 will have a regular array of circular transparencies corresponding to each of the cavities 16 of FIG. 17.

A silicon dioxide or silica ($SiO_2$) barrier layer on wafer 12 is preferably used which may be conveniently prepared by thermal growth on surfaces of the bottom layer 12, as by placing layer 12 in a high temperature furnace in an atmosphere of oxygen until the oxide layer grows to a thickness of about 10,000 Angstroms. The oxide layer is coated with a photoresist layer like layer 72 in FIG. 11 which is then exposed to ultra-violet radiation to form an array of circular polymerized masks conforming to the desired array of circular cavities 16 of FIG. 17. Alignment strips on the mask again are used to align the mask with the flats 25, 26 of wafer 12. This ensures that the circuit elements already formed on layer 11 will be perfectly aligned with cavities 16 in the base layer 12. The masking and a subsequent silicon dioxide etching process define an array of circular areas on wafer 12 that are freed of the silica layer, which now has the general appearance of FIG. 14.

The silica in the remaining areas is employed as an etching mask; when the wafer 12 with its surface prepared in this manner is placed in a conventional agitated silicon etchant, the bare silicon regions of layer 12 are etched much more rapidly than the silica in those regions still covered with silica. Etching is continued until each of the cavities 16 of the array of FIG. 17 has been etched to a depth of 2 to 5 microns, while the silica-covered regions are substantially undisturbed. At the conclusion of the cavity etching step, the remainder of the silicon-dioxide layer is removed by placing the wafer 12 in a conventional etch solution that attacks only the silica, the developed photoresist material having previously been removed.

To prepare the parts 11 and 12 for assembly, a layer about 10,000 Angstroms thick of gold or aluminum is formed by evaporation in a vacuum chamber from a suitable metal source on the upper or cavity-bearing surface of wafer 25. The purpose of the metal layer is to form the bond at interface 86 of FIG. 3 or 3a between wafers 11 and 12.

Referring now to FIG. 18, the sensor-bearing wafer 11 and the cavity bearing wafer 12 are placed one above the other with the flats 25, 26 of both bearing against the inner sides of an ell-shaped jig 90. The jig 90 is made of quartz and is placed as a passive reference element between two copper heating blocks of an electric furnace for alloying the gold or aluminum interface 86. The jig 90 and the flats 25, 26 are used to ensure alignment of each of the cavities with its own discrete bridge sensor circuit. Thus, the circuits on wafer 11 are each aligned with a cavity in wafer 12, the flats 25, 26 on both wafers being precisely matched.

The copper heating blocks are surfaced with stainless steel and have heater elements laced through them. In the bonding process, the wafers 11, 12, jig 90, and the heating blocks may be placed either in a nitrogen atmosphere or preferably in a hard vacuum. The temperature of the wafers is raised just above the eutectic level for silicon and the bonding metal (577° Centigrade for aluminum and 370° Centigrade for gold). The bonding temperature is maintained for at least 2 hours so that a strong alloy bond is achieved. The assembly is cooled by disconnecting the heating power and waiting for an hour, after which the assembly is removed from the furnace.

The upper or bridge sensor-bearing surface of the assembly still is covered by a protective layer of silicon oxynitride upon which electrical conductors are now to be established. It has been seen from FIGS. 4 and 5 that each sensor bridge element must have contacts which couple to external circuits, including contacts 92, 93, 94, 96, 97, 98, 99, and 100 of FIG. 5. Also, contacts for external circuit connection are made to the type n isolation fields at 91, 95 and 101. For this purpose, the silicon oxynitride layer is coated with a photoresist material and is developed using an ultraviolet light mask which has transparencies corresponding to the locations of the desired contacts to the resistors and to the type n isolation fields. The undeveloped photoresist is removed in the usual manner, permitting use of the silicon oxynitride etchant as previously described to etch through the insulating silicon oxynitride layer. The remaining photoresist is removed in the usual manner.

The open windows in the silicon oxynitride layer are next filled with aluminum which also is extended as a layer about 5000 Angstroms thick over and bonded to the entire remaining surface of that insulating layer by conventional vacuum evaporation. The interconnecting leads 110 through 116 are then defined by forming and developing an additional photo-resist pattern over the aluminum layer which protects only the aluminum where the leads are to remain, other parts of the aluminum layer being removed by a suitable etchant which does not attack silicon oxynitride. As seen in FIG. 4, the ends of the respective leads 110 through 116 may be supplied with enlarged areas 17 through 23 for bonding to an external circuit, such as by soldering or thermal compression bonding. If desired, the entire connector system with the exception of the enlarged contacts 17 through 23 may be coated with a protective material of known kind. After separation by dicing, the individual pressure transducers may be mounted as desired and are ready for use.

Referring to FIGS. 5 and 19, appropriate electrical potentials are applied to the isolation fields 31, 32, 33 for providing means for electrically trimming the respective type p resistors 34, 35, 36, and 37. The desired trimming is achieved by developing an adjustable reverse bias across the junction beween each type p resistor and its associated isolation field. Thus, in FIG. 19, the adjustable voltage $V_1$ is applied in common via lead 112 to the isolation field 32 associated with resistors 35 and 36. Adjustable voltage $V_2$ is supplied via lead 116 to the field 33 associated with resistor 37, while adjustable voltage $V_3$ is supplied via lead 110 to the field 31 associated with resistor 34.

The desired trimming is accomplished by developing corrective variable reverse biases across the individual junctions between the resistors and the isolation fields. The junction space charge in each case will vary in width with the magnitude of the bias voltage and will thus vary the cross-sectional area occupied by the mobile carriers in the type p resistor being affected. Therefore, an increase in the space charge width causes a reduction in the effective cross-sectional area of the resistor and, hence, a corresponding increase in its resistance, permitting the individual resistors to be permanently adjusted to optimum values.

It is thus seen that the invention as manufactured according to the described process is a miniature pressure transducer of general utility which may be mass produced employing simple procedures that produce a reliable and inexpensive product, use of mechanical parts being generally avoided. The novel transducer employs a piezoresistor bridge for providing an accurately calibratable measure of deflection of a pressure stressed diaphragm having complete continuity with the body of the transducer so that uniform and symmetric integration of the diaphragm with the body of the transducer is achieved, as well as freedom from undesirable temperature sensitivity characteristics.

While the invention has been described in its preferred embodiments, it is to be understood that the words which have been used are words of description rather than of limitation and that changes within the purview of the appended claims may be made without departing from the true scope and spirit of the invention in its broader aspects.

I claim:

1. Transducer means comprising:
   first and second bodies of type p conductivity semiconductor material thermally bonded together at a common interface by permanent eutectic metal layer means for providing a unitary body,
   sealed cavity means within said unitary body at said common interface for forming in said first body diaphragm flexure means at an exterior surface of said first body substantially parallel to said common interface.
   a diffused type n conductivity semiconductor region within said diaphragm flexure means at said exterior surface,
   a diffused type p conductivity semiconductor region within said type n conductivity semiconductor region at said exterior surface, and
   first and second electrical conducor means discretely coupled at spaced points respectively to said diffused type n and p conductivity semiconductor regions.

2. Apparatus as described in claim 1 wherein said common interface lies in a plane substantially parallel to the [111] crystallographic direction of the semiconductive material comprising said first and second bodies.

3. Apparatus as described in claim 2 wherein the semiconductor material of said first and second bodies has a resistivity of substantially 10 ohm centimeters.

4. Apparatus as described in claim 1 wherein said sealed cavity means comprises a substantially evacuated right circular cylinder having substantially flat ends substantially parallel to said common interface.

5. Apparatus as described in claim 1 wherein said diffused type n conductivity semiconductor region comprises silicon doped with phosphorous.

6. Apparatus as described in claim 5 wherein said diffused type p conductivity semiconductor region comprises silicon doped with boron and demonstrates piezoresistivity when said diaphragm flexure means is flexed.

7. Apparatus as described in claim 1 wherein said exterior surface is substantially covered with a protective layer of silicon oxynitride except where said electrical conductor means couple to said respective diffused type n and p conductivity semiconductor regions.

8. Apparatus as described in claim 7 wherein said electrical conductor means lie in bonded relation over said silicon oxynitride layer.

9. Apparatus as described in claim 1 wherein:
   first, second, and third spaced diffused type $n$ conductivity semiconductor regions lie within said diaphragm means at said exterior surface.

10. Apparatus as described in claim 9 wherein:
    first and second diffused type p conductivity semiconductor regions lie within said first type n conductivity semiconductor region at said exterior surface, and
    third and fourth diffused type p conductivity semiconductor regions lie within said respective second and third type n conductivity semiconductor regions at said exterior surface.

11. Apparatus as described in claim 10 wherein:
    said first electrical conductor means form with said first, second, third, and fourth diffused type p conductivity semiconductor regions piezoresistor bridge means for detecting displacement of said diaphragm flexure means.

12. Apparatus as described in claim 11 wherein:
    said second electrical conductor means form bias voltage coupling means for coupling a bias voltage between at least one of said diffused type n conductivity semiconductor regions and said piezoresistor bridge.

* * * * *